United States Patent [19]

Beck et al.

[11] Patent Number: 4,471,395
[45] Date of Patent: Sep. 11, 1984

[54] SELF-VENTILATED RECIRCULATING AIRFLOW SYSTEM

[75] Inventors: John L. Beck, Byron; Daniel O. Castrodale, Rochester; Richard W. Luoma, Chatfield; James M. Rigotti, Rochester, all of Minn.

[73] Assignee: International Business Machines Corporation, Armonk, N.Y.

[21] Appl. No.: 378,967

[22] Filed: May 17, 1982

[51] Int. Cl.³ .............................................. G11B 5/012
[52] U.S. Cl. ..................................................... 360/98
[58] Field of Search ....................... 360/98, 97, 99, 86, 360/133, 135; 206/444

[56] References Cited

U.S. PATENT DOCUMENTS 4,317,146  2/1982  Gervais ................................... 360/98
4,367,502  1/1983  Iftikar ..................................... 360/133
4,396,964  8/1983  Morehouse ............................. 360/98
4,412,261  10/1983  Tateyama .............................. 360/98

Primary Examiner—Robert M. Kilgore
Attorney, Agent, or Firm—Robert W. Lahtinen

[57] ABSTRACT

Shown and described is a recirculating air system for a disk drive assembly wherein air moves radially over the disk surfaces, over the transducer carriage at an increased velocity, past the actuator mechanism and through a filter before recirculation is induced by the hub assembly on which the disks are mounted and which functions also as an impeller. The hub-disk assembly also forms an integral part of the drive motor rotor assembly. Also, a breather filter and breather opening communicate with the recirculating air path at the low pressure location of the recirculating path to assure that air entering the system passes through the breather filter.

9 Claims, 4 Drawing Figures

SELF-VENTILATED RECIRCULATING AIRFLOW SYSTEM

BACKGROUND OF THE INVENTION

This invention pertains to drives for data carrying disk assemblies and more particularly to a recirculating airflow system for such drives.

A common problem in magnetic disk drives is the sweeping of particulate matter from the data transfer surfaces. Since the transducer or slider carrying the transducer flies on an air bearing with a thickness measured in millionths of an inch, a particle having a dimension of only one micron is several times the air bearing thickness. Particles may be generated during manufacture despite clean room conditions, may be carried by air drawn into the disk enclosure, may occur through leakage past seals. Drive components exposed within the enclosure constitute another source of particles, particularly the head and disk which contact during start and stop operations. Most disk drives are now enclosed with filtered air passed through a recirculating path to limit the amount of air introduced into the enclosure to that resulting from changing conditions of temperature and pressure which can be channeled through a breather filter to entrap airborne particles.

Another source of particulate matter problems is the permanent magnets associated with actuators or drive motors. The permanent magnets and associated magnetic circuits are coated with a urethane compound to captivate magnetic particles and prevent them from getting into the airflow path. However, the possible introduction of such particles is a hazard not only to the aerodynamics of the slider carrying the transducer, but also may erase data from the surface of the disk media.

SUMMARY OF THE INVENTION

The invention includes a disk hub having generally radial ribs or partition walls that form channels in the top and sides. A hub cap with a central opening is clamped to the top surfaces of the hub. The cap and hub combine to define generally radial flow paths extending from the central axial port in the cover to the ported spacers adjoining and intermediate to the plurality of disk surfaces. This allows the hub to act as the impeller of a centrifugal pump. Air enters the hub near its axis of rotation and flows along the top and down the sides in the relieved areas between the ribs. The ports adjacent each of the disk surfaces formed in spacers or hub portions are sized and positioned to provide uniform air distribution across all disk data surfaces. The airflow volume and velocity are selected to assure that the particles are swept away without impairing the transducer head flying dynamics.

Air leaving the disk surfaces sweeps around the disk enclosure cavity and then enters the linear voice coil actuator cavity. A shroud or baffle placed at the entrance of the actuator cavity provides some isolation between the disk enclosure area and the actuator enclosure area. The shroud or baffle also causes an air velocity increase at the actuator cavity entrance. This allows the file to be purged by a lower cubic foot per minute airflow. The higher air velocity prevents wear particles generated at actuator bearing to guideway interfaces from being carried into the disk cavity during an inward head seek excursion. The velocity increase also allows the actuator to be purged of wear particles at the lowest possible volumetric flow. After passing through the actuator assembly, the air is routed out of the disk enclosure area through a recirculating air filter and then recycled back into the disk enclosure through an axial opening at the center of the hub. A breather filter is also placed in the return path at the lowest pressure point in the air system. The breather filter's primary function is to allow pressure equalization between the disk enclosure and the external environment. However, the filter's placement at a low pressure point provides another benefit. If a disk enclosure seal leak should develop, the leak will be outward and makeup air will be clean since it will be supplied through the breather filter. Recirculating systems have the advantage of much longer filter life, as the recirculating air has been exposed to clean file components only. In such a system both the recirculating air filter and the breather filter should last for the life of the file.

DETAILED DESCRIPTION

Figure 1:
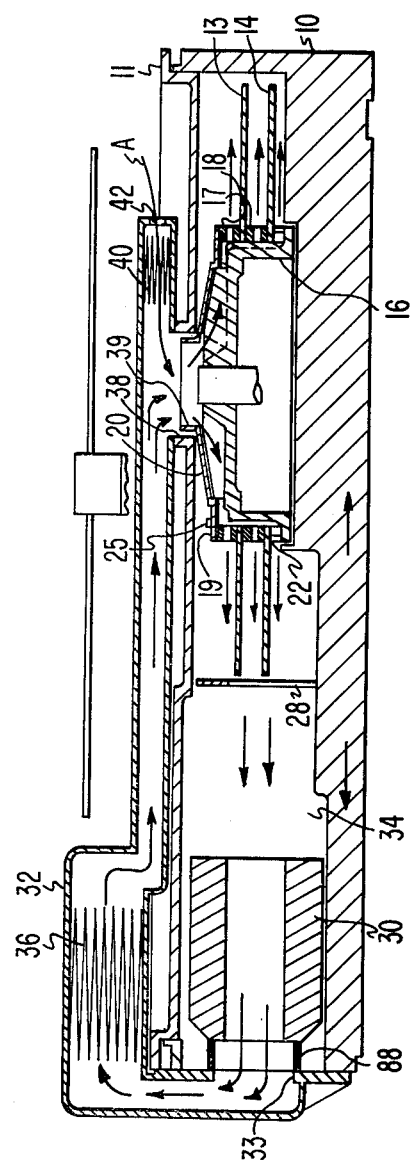
FIG. 1 is a longitudinal section view of a disk drive incorporating the present invention, showing the disk and actuator enclosures, the impeller formed by the hub carrying the disks and the recirculating airflow path.

FIG. 1 is a section view of a disk drive illustrating the present invention. The drive is housed in a base casting 10 and a closure cover 11 secured to the base casting. The disks 13, 14 are mounted for rotation in unison with hub 16. The disk mounting includes spacers 17, 18; clamping ring 19 and hub cap 20. With the disks compressively retained between the clamping ring 19 and hub flange projections 22 by a series of bolts 25. The generally cylindrical enclosed space in which the disks are maintained and the connected elongated space occupied by the transducer actuator are partially isolated from one another by a shroud or baffle 28. FIG. 1 schematically shows only the outlines of the actuator mechanism 30 without the carriage and transducers that extend to a position of data transfer confronting relation with the surfaces of disks 13, 14. The air flows over the carriage (not shown) and through the actuator 30 to the return air circulation path provided by the filter-breather assembly 32.

Figure 4:
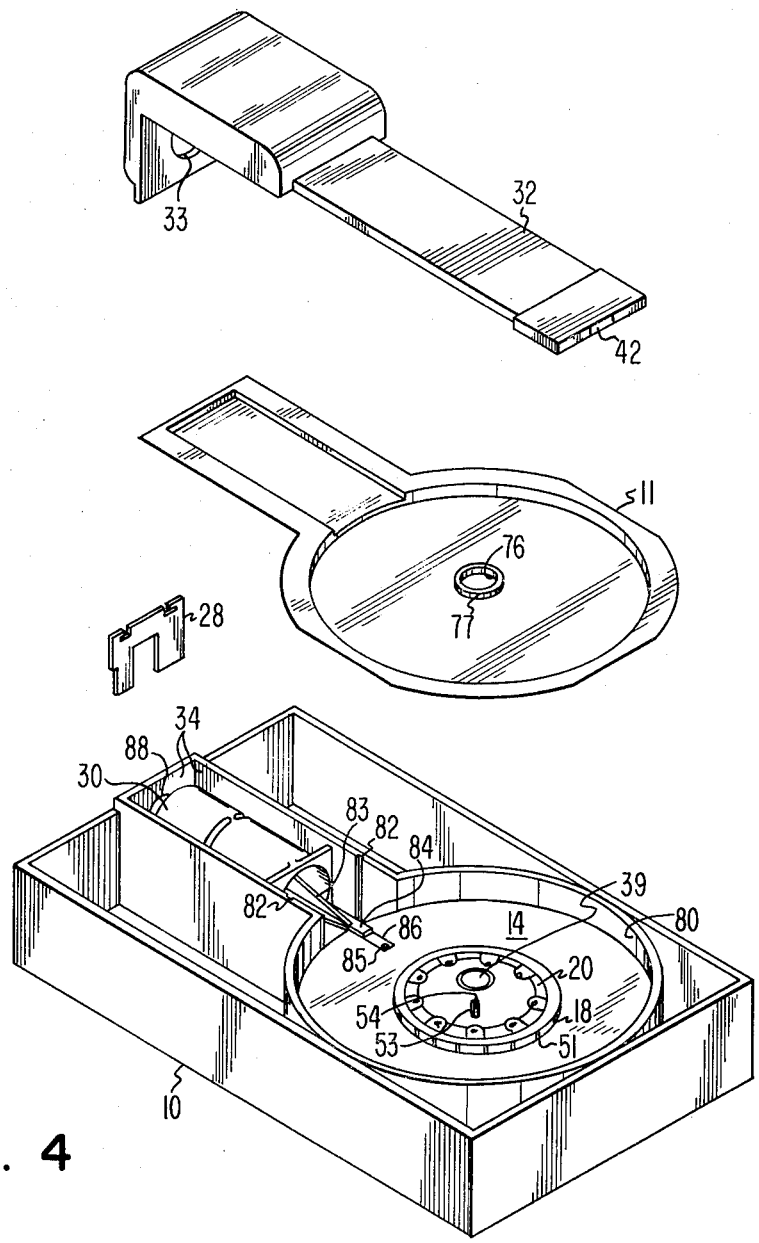
FIG. 4 is an exploded isometric view of the drive of FIG. 1 showing the base, hub-disk assembly, actuator, shroud, top cover and filter breather assembly.

The assembly 32 has an inlet opening 33 that communicates with the actuator chamber defined by walls 34 (FIG. 4). The full flow of the recirculating air passes through the recirculating filter 36 and the air exits from the assembly 32 through outlet opening 38 adjacent the axial opening 39 in hub cap 20. A breather filter separates particulate matter from the air that enters the system through opening 42. Air entering the system, as indicated by arrow A, may be caused by thermal expansion or other pressure changes or because of leakage that may occur at seals about covers or closure members. The breather filter 40 is located adjacent the axial inlet of the hub cap 20 which is at the inlet to the hub passageways that form the impeller for inducing the air recirculation. The breather filter location at the impeller inlet places the breather inlet at the lowest pressure portion of the air recirculation path. This placement will cause any impairment of the integrity of the seals to cause the air to be expelled since the air pressure at the locations of air leakage would be greater than at the inlet through the breather filter to assure that unfiltered air is not permitted to enter into the system.

Figure 2:
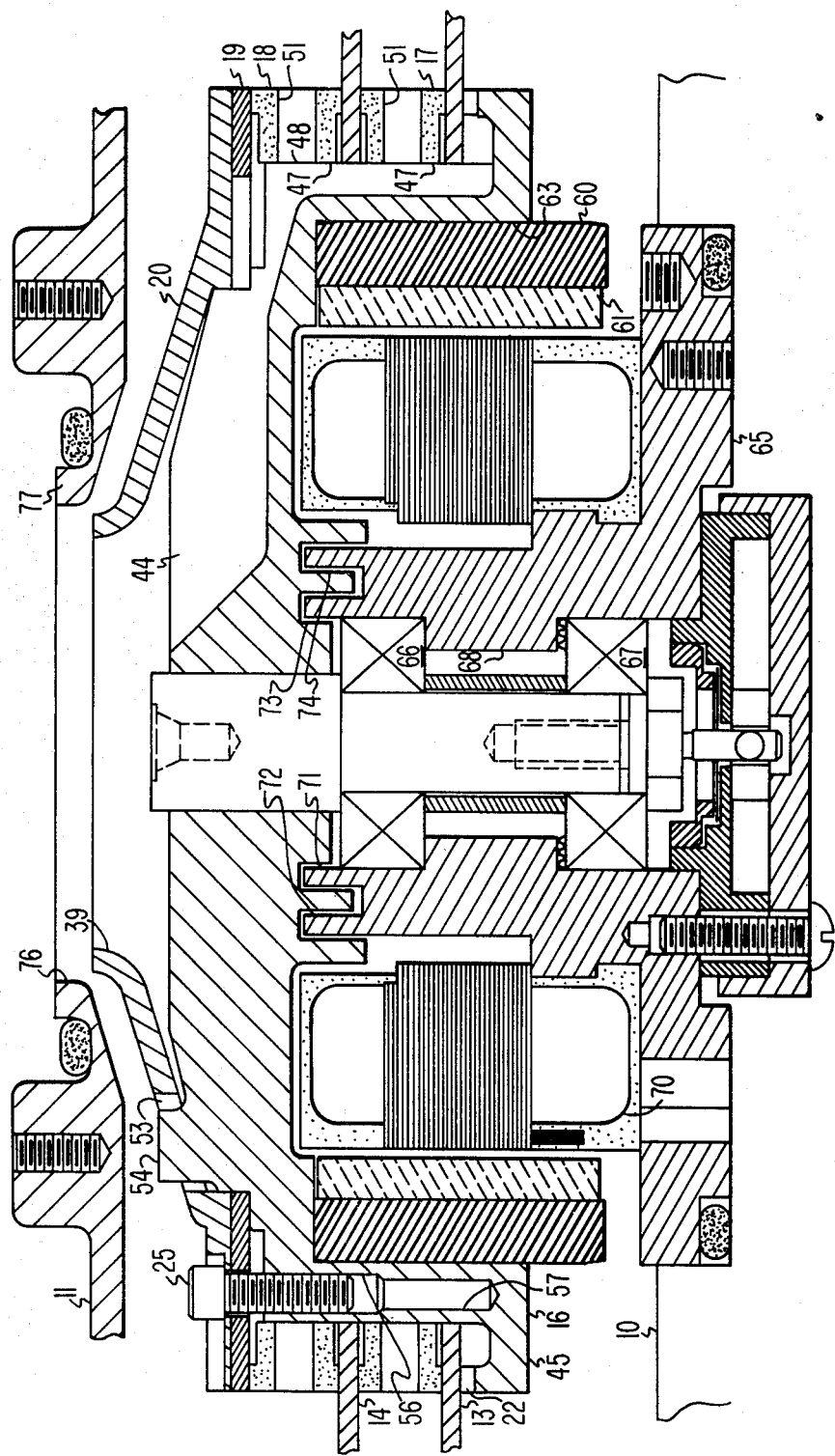
FIG. 2 is an axial section of the hub-disk assembly and concentric drive motor and includes portions of the drive base casting and top cover.
Figure 3:
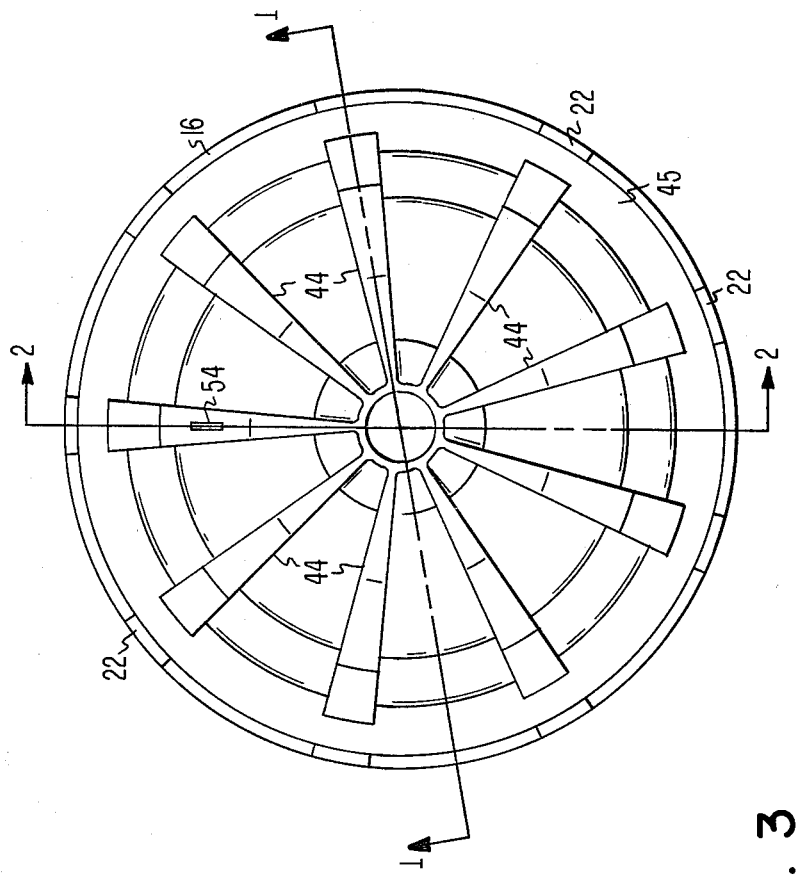
FIG. 3 is a plan view of the hub casting.

FIG. 2 shows the hub structure in greater detail to demonstrate the function as a mounting for the disks, as an impeller for establishing the recirculating airflow and as a part of the drive motor rotor. The hub 16 (as seen also in FIG. 3) has a series of radial vanes 44 with intermediate recesses that provide the impeller action when enclosed by hub cap 20. The radially extending flange 45 terminates with a series of axially extending projections 22 which are aligned with the vanes 44 to provide the abutting support surfaces for the first disk 13. Axially intermediate the disks 13, 14 and axially beyond the final disk 14 are spacers 17, 18. The inner cylindrical surfaces 47 of the spacers 17, 18 are confined by the surfaces 48 of the vanes 44, while radial ports or openings 51 extend from the confined spaces between vanes 44 and the inward radial surfaces of the respective disks 13, 14. The hub cap 20 has one slotted opening 53 which accommodates a projection 54 on one vane 44 to provide a convenient source for a timing signal. A clamp ring 19 is positioned between hub cap 20 and spacer 18 so that a series of bolts 25 extending through hub cap and clamp ring apertures are received in threaded bores 56 in the respective hub vanes 44. It will also be noted that the bores 56 are axially extended with a reduced diameter portion 57 which provides a hole for receiving balance weights to affect a correct balance for the rotating mass including the hub-disk assembly, motor ring 60 and motor magnet 61.

The hub 16 also functions as a part of the rotor assembly of the drive motor. Motor ring 60 and motor magnet 61 are secured against the inner cylindrical surface 63 of hub 16 and rotate in unison therewith. Hub 16 is mechanically connected to the central stator assembly 65 by a pair of bearings 66, 67. The stator assembly includes a center core 68 upon which the bearings 66, 67 are supported and which also carries the motor windings 70. The region adjacent the upper bearing 66 is semi-isolated from the disk enclosure by a labyrinth path created by annular projections 71, 72 which are respectively received in the hub annular recesses 73, 74. The hub cap 20 central axial opening 39 is aligned with the cover opening 76 defined by the flange 77.

FIG. 4 illustrates the base casting 10 in which the hub-disk assembly rotates within an enclosure defined by the cylindrical wall 80 and the actuator 30 resides in the elongated space extending from the disk enclosure. The shroud or baffle 28 is received in slots 82 in base 10 to provide a reduced opening at the juncture of the two enclosed spaces. The actuator housing 30 has a projection 83 that supports one of the ways upon which the carriage 84 reciprocates to position the transducer 85 and transducer support 86 with respect to the disk surface. The carriage 84 supports one transducer support 86 and one transducer 85 in data transfer relation to each of the four data surfaces on the two disk drives shown. Top cover 11 encloses the disk assembly enclosure area and the actuator enclosure area. The filter-breather assembly 32 is secured to base 10 and top cover 11 to provide the recirculating air passageway and the filtered communication with breather opening 42. The filter-breather assembly opening 38 communicates with the top cover opening 76 and tubular gasket 88 causes the recirculating airflow path to be directed through the actuator housing 30. The filter-breather assembly also has an opening 38 that adjoins top cover opening 76 to return air to the axial suction opening of the impeller formed by the hub assembly. The positioning of the breather filter 40 and the breather opening 42 closely adjacent opening 39 to the hub assembly that serves as an impeller, places the inlet for makeup air adjacent the lowest pressure of the recirculating air path so that any leakage in the system will be at a higher pressure causing ingested air to pass through the breather filter.

In operation the hub assembly is an integral part of the rotor of the motor which also serves as the air impeller. The generally radial air passages defined by the vanes 44 and hub cap 20 induce an airflow from the axial suction opening 39 in the hub cap 20 to the ports 51 of the spacers 17, 18 and the spaces between hub axial projections 22. The outlets are adjacent each of the disk surfaces causing a radial airflow to sweep over and purge the disk surfaces. The radial airflow is maintained over the disk surfaces at a volume that will not interfere with the flying characteristics of the transducer heads 85 or the head carrying slider while achieving very good purging of the surfaces. The reduced opening in shroud 28, through which the actuator carriage 84 moves during radial seek operations, increases the air velocity in purging over the carriage to enhance particle removal or prevent particles from entering the disk assembly enclosure. The recirculating air path passes through the actuator 30 and the recirculating air filter 36 downstream from the actuator to assure that particulate matter does not enter the disk assembly enclosure area. The passage for any necessary makeup air, as a result of temperature or pressure changes or leakage in the system sealing, joins the recirculating air path adjacent the suction opening of the impeller to assure that the air entering the system passes through the breather filter 40.

Since hub 16 forms an integral part of the drive motor rotor, the passage of recirculating air over the extended surface as represented by the vanes 44 causes the air circulation to dissipate heat generated by the motor in addition to contaminant purging. Further, the location of the motor concentrically within the hub-disk assembly makes unnecessary a drive shaft opening to the disk enclosure area to thereby eliminate the sealing problems or particulate generation associated with such a drive element entry location.

While the invention has been particularly shown and described with reference to a preferred embodiment thereof, it will be understood by those skilled in the art that various changes in form and details may be made therein without departing from the spirit and scope of the invention.

What is claimed is:

1. An enclosed disk drive, including base and cover elements within which disk media are rotated and accessed by movable transducers mounted on a carriage that is positioned by an actuator mechanism, comprising a hub upon which rotatable disk media are mounted for unitary rotation;
 vane elements formed in said hub;
 passage means formed along the surface of said hub intermediate said vane elements;
 outlet openings peripherally arranged about said hub to provide communication between said passage means and the spaces adjacent each of the data surfaces of said disk media, whereby hub rotation causes said vanes to impell air from a location adjacent an axial end of said hub through said outlet openings to induce a radial airflow over each of the major surfaces of said disk media;

connecting passage means from adjacent the periphery of said disk media to said location adjacent said hub axial end; and filter means disposed in said connecting passage means;

said actuator mechanism being disposed in said connecting passage upstream from said filter means.

2. The enclosed disk drive of claim 1 further comprising wall means which substantially closely surround the periphery of said disk media and confront the major surfaces of said disk media except in the peripheral region at which transducer actuator access occurs, whereby the total enclosure air space is frequently totally swept to purge airborne particulate matter.

3. An enclosed, magnetic disk drive having an enclosure including a base and a cover in which a plurality of disk media are rotated and accessed by movable tranducers mounted on a carriage that is position by an actuator mechanism comprising a hub upon which said plurality of disk media are mounted for unitary rotation therewith;

generally radially extending vanes formed in said hub;

hub cover means having an axial aperture;

spacer means adjoining said disk media including radial openings adjacent said disk media surfaces;

clamping means securing said disk media, hub cover means and spacer means to said hub to define generally radially extending passage means from an axial inlet opening to said radial openings in said spacer means, whereby a radial airflow is induced by hub rotation;

air passage means extending from the periphery of said disk media to adjacent said hub cover means axial aperture, said actuator mechanism being mounted in said passage means; and a filter mounted in said passage means downstream from said actuator mechanism.

4. The enclosed, magnetic disk drive of claim 3 wherein said hub forms an integral portion of the rotor of the disk media drive motor.

5. The enclosed, magnetic disk drive of claim 4 wherein said hub is a cup-shaped element having a plurality of disk media mounted about the convex outer surface and the motor magnet mounted concentrically adjacent the concave inner surface.

6. The enclosed, magnetic disk drive of claim 3 wherein said actuator mechanism is connected to transducer carriage means that extends from said passage means to present transducers in data transfer relationship with respect to said disk media, further comprising a shroud element in said passage means in partial surrounding relationship with respect to said carriage means.

7. The enclosed, magnetic disk drive of claim 3 further comprising a second filter having one side in communication with said air passage means downstream from said filter mounted in said air passage means and the other side communicating with an opening in the disk drive enclosure whereby air entering or departing from the enclosed volume of said disk drive as a result of temperature or pressure variations passes through said second filter.

8. The enclosed, magnetic disk drive of claim 7 wherein said second filter communicates with said air passage means in close proximity to said hub cover axial inlet opening, whereby said second filter communicates with the recirculating airflow path at the low pressure portion of such path so that any breach of the disk drive enclosure seal will cause leakage to be outward through the breach and new air introduced within the drive enclosure to enter through said second filter.

9. The enclosed, magnetic disk drive of claim 5 wherein the recirculating airflow path over said hub is in heat transfer relation with respect to said motor.

* * * * *